United States Patent
Wu

(10) Patent No.: US 11,991,420 B2
(45) Date of Patent: May 21, 2024

(54) LIVE COMMENTING PROCESSING METHOD AND SYSTEM

(71) Applicant: SHANGHAI BILIBILI TECHNOLOGY CO., LTD., Shanghai (CN)

(72) Inventor: Xiuran Wu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 65 days.

(21) Appl. No.: 17/779,532

(22) PCT Filed: Mar. 26, 2020

(86) PCT No.: PCT/CN2020/081492
§ 371 (c)(1),
(2) Date: May 24, 2022

(87) PCT Pub. No.: WO2021/103364
PCT Pub. Date: Jun. 3, 2021

(65) Prior Publication Data
US 2022/0408160 A1 Dec. 22, 2022

(30) Foreign Application Priority Data
Nov. 25, 2019 (CN) .......................... 201911168271.7

(51) Int. Cl.
H04N 21/488 (2011.01)
H04N 21/431 (2011.01)

(52) U.S. Cl.
CPC ..... H04N 21/4884 (2013.01); H04N 21/4312 (2013.01)

(58) Field of Classification Search
None
See application file for complete search history.

(56) References Cited

U.S. PATENT DOCUMENTS 10,715,881 B2 * 7/2020 Qu .................... H04N 21/4532
11,483,366 B2 * 10/2022 Markan ............... G11B 27/102
(Continued)

FOREIGN PATENT DOCUMENTS

| CN | 104967896 A | 10/2015 |
|---|---|---|
| CN | 105828164 A | 8/2016 |

(Continued)

OTHER PUBLICATIONS

International Patent Application No. PCT/CN2020/081492; Int'l Search Report; dated Aug. 17, 2020; 3 pages.

*Primary Examiner* — Mushfikh I Alam
(74) *Attorney, Agent, or Firm* — BakerHostetler

(57) ABSTRACT

The present disclosure describes techniques of processing bullet comments. The techniques comprise acquiring a page of playing a video to output a video stream; acquiring multiple pieces of bullet comment data associated with the video stream; traversing the multiple pieces of bullet comment data and determining whether the multiple pieces of bullet comment data comprise at least one piece of bullet comment data in an expired state; and deleting the at least one piece of bullet comment data in the expired state from the plurality of pieces of bullet comment data in response to determining that the plurality of pieces of bullet comment data comprise the at least one piece of bullet comment data in the expired state.

15 Claims, 6 Drawing Sheets

(56) References Cited

U.S. PATENT DOCUMENTS

| | | | |
|---|---|---|---|
| 2017/0180782 A1* | 6/2017 | Li | H04N 21/8126 |
| 2017/0264585 A1 | 9/2017 | Xu et al. | |
| 2018/0192142 A1* | 7/2018 | Paul | H04N 21/44245 |
| 2019/0132275 A1* | 5/2019 | Kelly | H04L 65/611 |

FOREIGN PATENT DOCUMENTS

| | | |
|---|---|---|
| CN | 106101863 A | 11/2016 |
| CN | 107371056 A | 11/2017 |
| CN | 108696766 A | 10/2018 |
| WO | WO 2017/166719 A1 | 10/2017 |

* cited by examiner

LIVE COMMENTING PROCESSING METHOD AND SYSTEM

The present application is the U.S. National Stage of International Application No. PCT/CN2020/081492, filed on Mar. 26, 2020, which claims priority of the Chinese Patent Application No. 201911168271.7, filed on Nov. 25, 2019, and entitled "Method and system for processing bullet comment", both of which are incorporated herein by reference in their entireties.

TECHNICAL FIELD

Embodiments of the present application relate to the field of communications, and in particular to a method and system for processing a bullet comment, a computer device, and a computer-readable storage medium.

BACKGROUND

Bullet comments refer to comments in the form of words, emojis, patterns, etc. presented simultaneously when a video is played. At present, bullet comments have become an important element for many viewers to watch videos and live streams. Bullet comments enable users to express their feelings when watching programs and read comments on the programs from other users as well, thus implementing interaction when the users watch videos.

However, the inventor has appreciated that when there are a huge number of bullet comments in a popular video, computing resources are greatly consumed. For example, a large number of memory resources are consumed.

SUMMARY

In view of this, an objective of embodiments of the present application is to provide a method and system for processing a bullet comment, a computer device and a computer-readable storage medium, to solve a technical problem of excessive consumption of computing resources caused by a huge number of bullet comments.

An aspect of the embodiments of the present application provides a method for processing a bullet comment, the method including: obtaining a video playing page, to output a video stream; obtaining a plurality of pieces of bullet comment data associated with the video stream; traversing the plurality of pieces of bullet comment data, to query whether the plurality of pieces of bullet comment data include at least one piece of bullet comment data in an expired state; and if the plurality of pieces of bullet comment data include the at least one piece of bullet comment data in the expired state, deleting the at least one piece of bullet comment data in the expired state from the plurality of pieces of bullet comment data.

Optionally, the method further includes: traversing the plurality of pieces of bullet comment data, to query whether the plurality of pieces of bullet comment data include a number of pieces of bullet comment data in a to-be-posted state, where posting time of each piece of bullet comment data in the to-be-posted state is earlier than or equal to current playing time of the video stream; and a sum of posting time and moving time of each piece of bullet comment data in the expired state is earlier than the current playing time.

Optionally, the video playing page is a WeChat mini program page, and the method further includes: obtaining the current playing time of the video stream by: updating a timeline in a mode of simulating requestAnimationFrame by using a bullet comment timeline, to determine an updated timeline as the current playing time of the video stream.

Optionally, the method further includes: if the plurality of pieces of bullet comment data include the number of pieces of bullet comment data in the to-be-posted state, adding the number of pieces of bullet comment data to a queue of bullet comments to be posted; determining, according to a virtual bullet comment track, whether a plurality of bullet comment tracks include one or more bullet comment tracks in an idle state, where the virtual bullet comment track is a preconfigured nested array, the nested array includes a plurality of subarrays, and each subarray is mapped to one of the plurality of bullet comment tracks; and if the plurality of bullet comment tracks include the one or more bullet comment tracks in the idle state: adding one or more pieces of bullet comment data in the queue of bullet comments to be posted to the virtual bullet comment track, where the virtual bullet comment track is used to determine whether each bullet comment track is in the idle state, and adding the one or more pieces of bullet comment data in the queue of bullet comments to be posted to a rendering list, to obtain one or more corresponding bullet comment elements through rendering.

Optionally, the method further includes: determining whether there is newly added bullet comment data in the queue of bullet comments to be posted; if there is the newly added bullet comment data in the queue of bullet comments to be posted, performing a partial rendering operation based on the newly added bullet comment data, to obtain a bullet comment width corresponding to the newly added bullet comment data.

Optionally, determining whether the virtual bullet comment track includes bullet comment data in the expired state; and if the virtual bullet comment track includes the bullet comment data in the expired state, deleting the bullet comment data in the expired state from the virtual bullet comment track.

Optionally, the video playing page is a WeChat mini program page, and the method further includes: determining whether the rendering list includes bullet comment data in the expired state; and if the rendering list includes the bullet comment data in the expired state, enabling a data pointer of the bullet comment data in the expired state in the rendering list to point to NULL.

An aspect of the embodiments of the present application further provides a system for processing a bullet comment, the system for processing a bullet comment including: a first obtaining module configured to obtain a video playing page, to output a video stream; a second obtaining module configured to obtain a plurality of pieces of bullet comment data associated with the video stream; a traversing module configured to traverse the plurality of pieces of bullet comment data, to query whether the plurality of pieces of bullet comment data include at least one piece of bullet comment data in an expired state; and a deletion module configured to: if the plurality of pieces of bullet comment data include the at least one piece of bullet comment data in the expired state, delete the at least one piece of bullet comment data in the expired state from the plurality of pieces of bullet comment data.

An aspect of the embodiments of the present application further provides a computer device, the computer device including a memory, a processor, and computer-readable instructions stored on the memory and executable on the processor, where when executing the computer-readable instructions, the processor implements the following steps:

obtaining a video playing page, to output a video stream; obtaining a plurality of pieces of bullet comment data associated with the video stream; traversing the plurality of pieces of bullet comment data, to query whether the plurality of pieces of bullet comment data include at least one piece of bullet comment data in an expired state; and if the plurality of pieces of bullet comment data include the at least one piece of bullet comment data in the expired state, deleting the at least one piece of bullet comment data in the expired state from the plurality of pieces of bullet comment data.

An aspect of the embodiments of the present application further provides a computer-readable storage medium having stored therein computer-readable instructions, where the computer-readable instructions can be executed by at least one processor to enable the at least one processor to perform the following steps: obtaining a video playing page, to output a video stream; obtaining a plurality of pieces of bullet comment data associated with the video stream; traversing the plurality of pieces of bullet comment data, to query whether the plurality of pieces of bullet comment data include at least one piece of bullet comment data in an expired state; and if the plurality of pieces of bullet comment data include the at least one piece of bullet comment data in the expired state, deleting the at least one piece of bullet comment data in the expired state from the plurality of pieces of bullet comment data.

According to the method for processing a bullet comment, the system, the device, and the computer-readable storage medium provided in the embodiments of the present application, a bullet comment recycling mechanism is provided, to delete expired bullet comment data. Deleting expired bullet comment data has at least the following advantages: 1. Memory usage is reduced because a plurality of pieces of bullet comment data are gradually decreased with a playing progress. 2. Wastes of computing resources caused by "re-traversing bullet comment data in an expired state" are avoided because the number of subsequent traversals of the plurality of pieces of bullet comment data is reduced.

DETAILED DESCRIPTION OF EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

Figure 1:
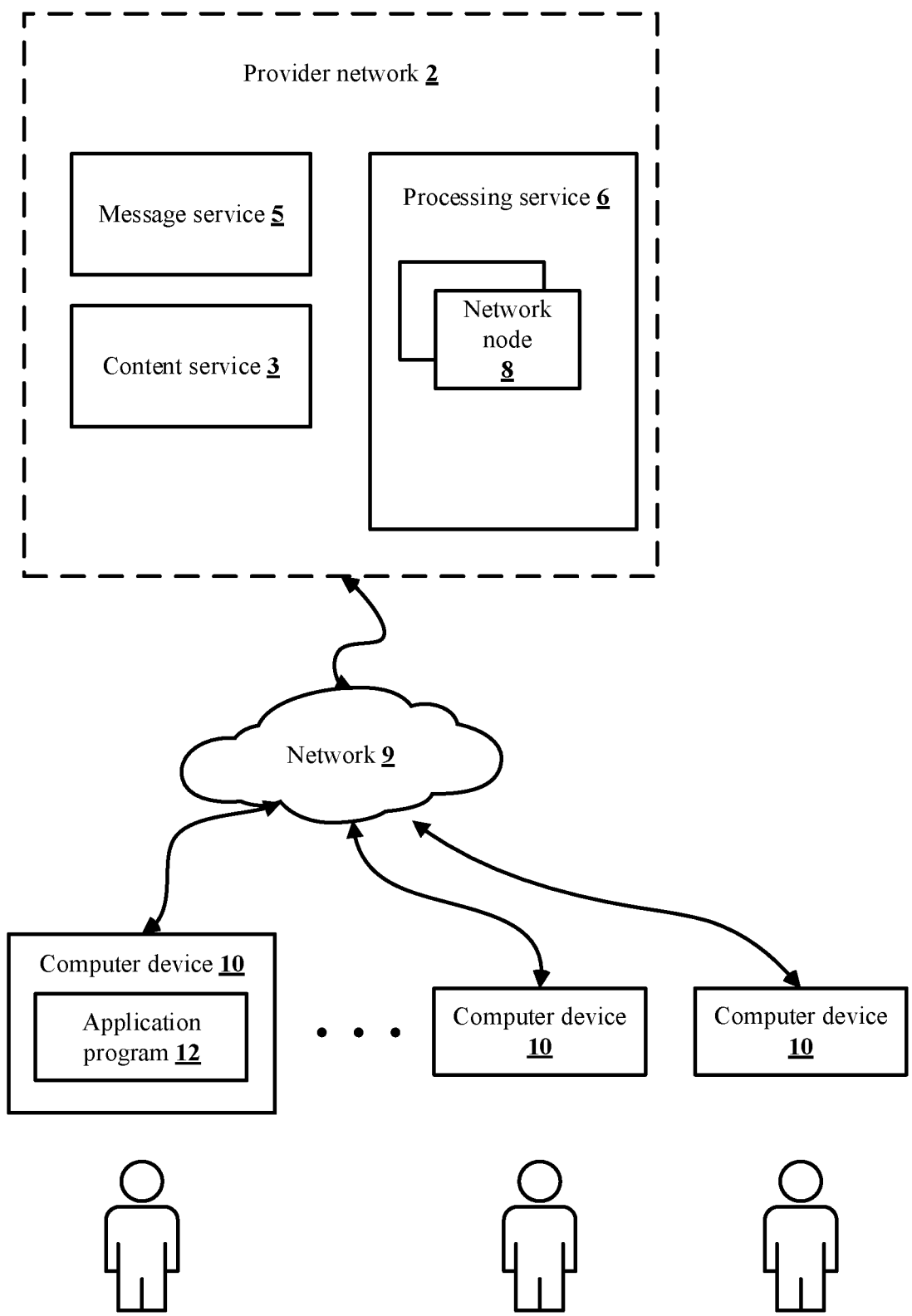
FIG. 1 is a diagram schematically showing an application environment of a method for processing a bullet comment according to an embodiment of the present application.

FIG. 1 is a schematic diagram schematically showing an environment application of a method for processing a bullet comment according to an embodiment of the present application.

A provider network 2 may be connected to a plurality of computer devices 10 through a network 9. In some embodiments, a content service 3 is provided by the provider network 2. In other embodiments, the content service 3 may be provided by an independent content provider connected to the provider network 2.

The content service 3 may include a content streaming service such as an Internet protocol video streaming service. The content streaming service may be configured to distribute content by using various transmission technologies. The content service 3 may be configured to provide content such as videos, audios, text data, and a combination thereof. The content may include content streams (for example, video streams, audio streams, and information streams), content files (for example, video files, audio files, and text files) and/or other data.

The provider network 2 may implement a bullet comment service. The bullet comment service is configured to allow a user to make comments and/or share comments associated with content. Bullet comment content may be presented on the same screen together with the content. For example, the bullet comment content may be displayed in an overlay image above the content. The bullet comment content may be displayed with an animation effect. For example, the bullet comment content may be displayed as the content scrolling (for example, from right to left, from left to right, from top to bottom, and from bottom to top), and this animation effect may be achieved on the basis of transition attributes of cascading style sheets 3 (CSS3).

The provider network 2 may be located in a data center, for example, on a single site, or distributed at different geographical positions (for example, on a plurality of sites). The provider network 2 may provide services via one or more networks 9. The network 9 includes various network devices, for example, routers, switches, multiplexers, hubs, modems, network bridges, repeaters, firewalls, proxy devices, and/or the like. The network 9 may include physical links, for example, coaxial cable links, twisted pair cable links, optical fiber links, and a combination thereof. The network 9 may include wireless links, for example, cellular links, satellite links, and Wi-Fi links.

The provider network 2 may include a message service 5. The message service 5 may be configured to receive a plurality of messages. The plurality of messages may include a plurality of pieces of bullet comment content associated with the content and information related to the plurality of pieces of bullet comment content.

The message service 5 may be configured to manage messages used for various content items. The user may browse the content and access different content items to view comments on specific content, for example, comments posted by other users on the specific content. A comment, associated with a specific content item, from a user, may be output to other users viewing the specific content item. For example, all users accessing a content item (for example, a video clip) may view comments associated with the content item. The input bullet comment content may be output in real time or almost in real time.

The message service 5 may be configured to process the plurality of messages. The message service 5 may queue the plurality of messages or prioritize them in other manners on the basis of information (for example, timestamps and incremental identifiers) associated with the corresponding bullet comment content. The message service 5 may be configured to process the plurality of messages through load balancing. For example, the message service 5 may be configured to use one or more of a plurality of processing nodes to process the plurality of messages, prioritize the messages, and perform load balancing on the messages. The message service 5 may at least temporarily store the plurality of messages. The message service 5 may store the plurality of messages in a data store such as a database.

The message service 5 may be configured to process the messages by performing a grouping process. The grouping process may include grouping of the plurality of messages on the basis of features. If two messages have the same features or fall within a threshold range of features, the two messages may be grouped into one group. Messages associated with the specific content item (for example, a stream, a file, a program, a movie, a song, and a game session) may be associated with the same group. For example, a message may include or be associated with a content identifier. The content identifier may uniquely identify a content item. If the content identifier is found in a message or is associated with a message (for example, is sent separately), the message service 5 may associate the message with a group associated with the content item.

The message service 5 may perform natural language processing, topic recognition, pattern recognition, artificial intelligence, etc. to automatically determine a feature of a message and/or group the message. As an example, a phrase or a pattern which frequently appears may be recognized as a topic. As another example, a database of a topic associated with content may be maintained. The topic may include a genre (for example, an action, a drama, and a comedy), a personality (for example, an actor, an actress, and a director), a language, etc. Messages may be grouped on the basis of a feature of a client device and/or a user sending the messages. Demography, interest, history and/or the like may be stored for a plurality of users to determine potential groups of messages.

The message service 5 may be further configured to process the messages by generating output data. The output data may include an instruction for outputting a comment on the basis of corresponding context. The output data may include application data for applying an overlay comment on the basis of an indication of the context. The output data may include an instruction for generating (for example, encoding) content corresponding to a comment.

The output data may be used to generate (for example, encode) output bullet comment content, for example, output content streams. The output comment content may be combined (for example, multiplexed) with an original content item, for example, content provided by the content service 3. An obtained combination may include content in a single package (for example, a container, a transport container, and a transport stream). The package may include the original content item and the output bullet comment content (which is, for example, displayed on the top of the original content item).

The message service 5 may be further configured to process the messages by performing a screening process. The screening process may include rejecting or marking a message matching a screening criterion. The screening criterion may specify a term and/or a phrase, for example, profanity, a hate comment, and an indecent comment. The screening criterion may specify a character, for example, a symbol or a font. The screening criterion may specify a language, a computer-readable code mode, etc.

The provider network 2 may further include a processing service 6. The processing service 6 may be configured to provide processing for various services, for example, a service of the provider network 2. The processing service 6 may include a plurality of network nodes 8. The plurality of network nodes 8 may process a task associated with the message service 5. The plurality of network nodes 8 may be implemented as one or more computing devices, one or more processors, one or more virtual computing instances, a combination thereof, and/or the like.

The plurality of network nodes 8 may be implemented by one or more computing devices. The one or more computing devices may include a virtualized computing instance. The virtualized computing instance may include a virtual machine, for example, a simulation of a computer system, an operating system, or a server. The computing device may load a virtual machine on the basis of a virtual image and/or other data that defines specific software (for example, an operating system, a dedicated application program, or a server) for simulation. As requirements on different types of processing services change, different virtual machines may be loaded and/or terminated on the one or more computing devices. A hypervisor may be implemented to manage use of different virtual machines on the same computing device.

In some embodiments, the plurality of network nodes 8 may process events submitted by a plurality of computer devices. These events may be associated with discussions on real-time news, videos, social hotspots, reports on some user accounts, etc. In other embodiments, the plurality of network nodes 8 may process performance evaluation of a plurality of user accounts for reviewing events in a network community. In some implementations, these services may be implemented as dedicated computing devices, dedicated processors, dedicated virtual machine instances, and/or the like. In other implementations, various nodes may implement any function associated with these services.

The plurality of computer devices 10 may be configured to access content and a service of the provider network 2. The plurality of computer devices 10 may include any type of electronic devices, for example, mobile devices, tablet devices, laptop computers, workstations, virtual reality devices, game devices, set-top boxes, digital streaming media devices, vehicle terminals, smart televisions, set-top boxes and e-book readers.

The plurality of computer devices 10 may be associated with one or more users. A single user may access the provider network 2 using one or more of the plurality of computer devices 10. The plurality of computer devices 10 may travel to various positions and use different networks to access the provider network 2.

The computer device 10 may include an application program 12. The application program 12 outputs (for example, displays, renders, or presents) content to a user. The application program 12 may be a video client (for example, a bilibili client), a browser client, a WeChat mini program based on WeChat, etc. The content may include a video, audio, bullet comment content and/or the like. The bullet comment content may be words, emojis, patterns, etc., and may have different colors, sizes, animations, scrolling directions, etc.

As an example, the application program 12 may send reports on some users to the processing service, and the application program 12 may also send comments on the reports to the processing service 6. Events or comments sent from the plurality of computer devices 10 include reasons for submitting the events, content attributes associated with the events, user account information, etc.

Embodiment 1

Figure 2:
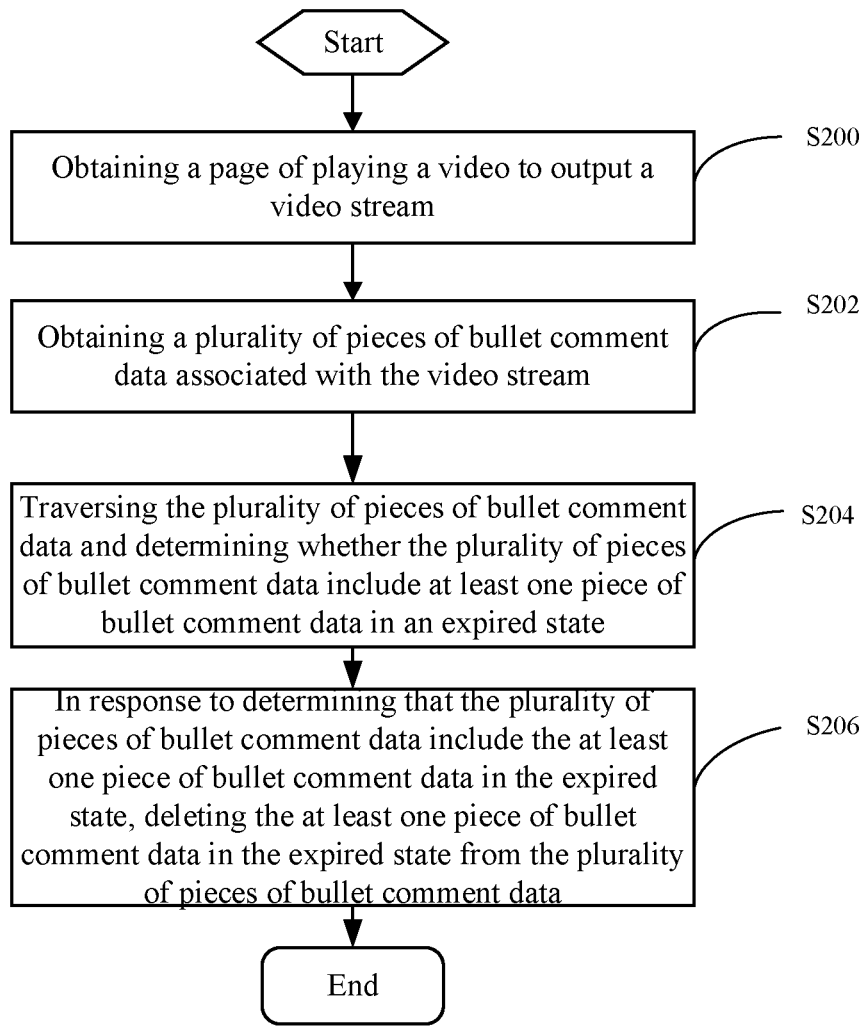
FIG. 2 is a flowchart schematically showing a method for processing a bullet comment according to Embodiment 1 of the present application.

FIG. 2 schematically shows the flow chart of a method for processing a bullet comment according to Embodiment 1 of the present application. It can be understood that this method embodiment may be executed in a computer device 10, and the flowchart of this method embodiment is not used to limit an order of executing steps.

As shown in FIG. 2, the method for processing a bullet comment may include steps S200 to S206, in which: In step S200, obtaining a page of playing a video to output a video stream.

In step S202, obtaining a plurality of pieces of bullet comment data associated with the video stream.

In an exemplary embodiment, the plurality of pieces of bullet comment data may be original bullet comment data.

In some other embodiments, the plurality of pieces of bullet comment data may alternatively be bullet comment data obtained by cloning a plurality of pieces of original bullet comment data. Specifically, after obtaining the plurality of pieces of original bullet comment data from a provider network 2, the computer device 10 clones the plurality of pieces of original bullet comment data. Here, the plurality of pieces of original bullet comment data are not used for bullet comment displaying, the plurality of pieces of bullet comment data are used for bullet comment displaying.

The plurality of pieces of original bullet comment data and the plurality of pieces of bullet comment data have the same information and are stored in an array format.

For example, each piece of bullet comment data may include the following information:

```
{
    stime, // Time of posting in a video in units of second
    mode, // Mode of a bullet comment
    size, // Size of bullet comment text
    color, // Color of bullet comment text
    date, // Creation date of a bullet comment
    class, // Class name of a bullet comment
    uid, // id of a user that creates a bullet comment
    dmid, // Bullet comment id
    text, // Text content of a bullet comment
    duration, // Duration of a bullet comment
    border, // Whether a bullet comment has a border
    borderColor, // Color of a bullet comment border
    style, // Interline style of bullet comments
}
```

In step S204, traversing the plurality of pieces of bullet comment data, to query whether the plurality of pieces of bullet comment data include at least one piece of bullet comment data in an expired state.

Bullet comment content is usually associated with a scene (that is, a displayed content segment), and therefore, each piece of bullet comment content has posting time that is associated with a content segment. When it is at a time point along a progress bar, it indicates that a content segment before the time point is a content segment in an expired state (where unless a video is replayed or the progress bar is dragged back by a user, the content segment in the expired state may not be played), and bullet comment data corresponding to the content segment in the expired state is bullet comment data in the expired state. It can be easily understood that the bullet comment data in the expired state is not displayed in a bullet comment displaying area, and is useless data.

Step S204 may be implemented through the following exemplary step: Determining whether each piece of bullet comment data is in the expired state according to the current playing time of the video stream and a posting time and a moving time of each piece of bullet comment data, where a sum of the posting time and the moving time of each piece of bullet comment data in the expired state is earlier than the current playing time.

A manner of obtaining the current playing time is as follows: After a bullet comment begins to be displayed, a bullet comment timeline simulates video time every 16 milliseconds in the mode of simulating requestAnimationFrame to update a timeline, to maintain synchronization of the bullet comment timeline and the current playing time of the video stream, where an updated timeline is the current playing time.

In step S206, if the plurality of pieces of bullet comment data include the at least one piece of bullet comment data in the expired state, deleting the at least one piece of bullet comment data in the expired state from the plurality of pieces of bullet comment data. If the plurality of pieces of bullet comment data do not include the bullet comment data in the expired state, the deletion operation is not performed.

When there are a huge number of bullet comments in a popular video, computing resources are greatly consumed, for example, a large number of memory resources are consumed. To solve the problem, this embodiment provides a bullet comment recycling mechanism, to delete expired bullet comment data. Deleting expired bullet comment data has at least the following advantages: 1. Memory usage is reduced because a plurality of pieces of bullet comment data are gradually decreased with a playing progress. 2. Wastes of computing resources caused by "re-traversing bullet comment data in an expired state" are avoided because the number of subsequent traversals of the plurality of pieces of bullet comment data is reduced.

Embodiment 2

Figure 3:
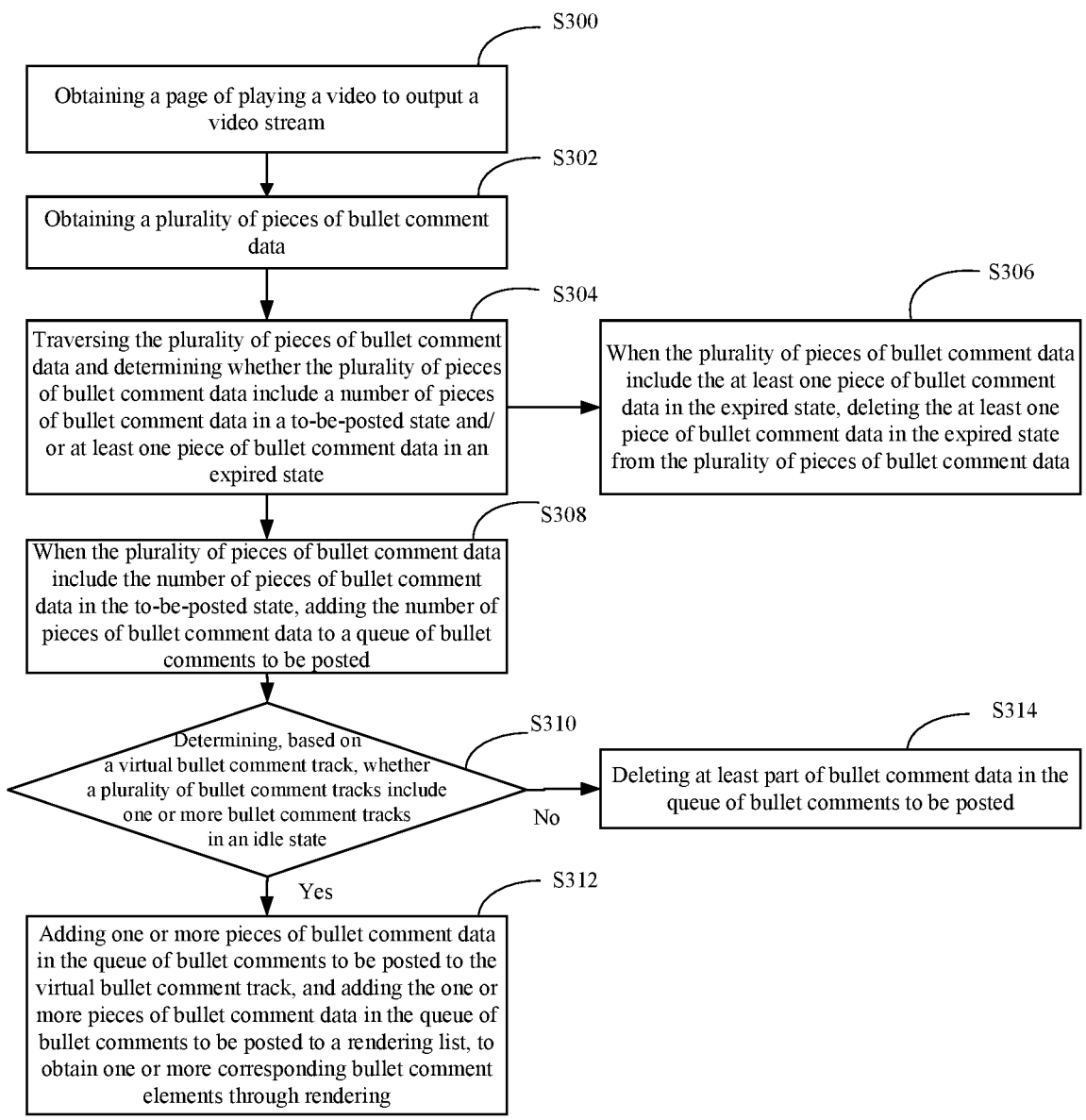
FIG. 3 is a flowchart schematically showing a method for processing a bullet comment according to Embodiment 2 of the present application.

FIG. 3 schematically shows a flow chart of a method for processing a bullet comment according to Embodiment 2 of the present application. The method for processing a bullet comment may include steps S300 to S314, where:

In step S300, obtaining a video playing page, to output a video stream.

In step S302, obtaining a plurality of pieces of bullet comment data associated with the video stream.

In an exemplary embodiment, each piece of bullet comment data may include the following content:

```
{
    stime, // Time of posting in a video in units of second
    mode, // Mode of a bullet comment
    size, // Size of bullet comment text
    color, // Color of bullet comment text
    date, // Creation date of a bullet comment
    class, // Class name of a bullet comment
    uid, // id of a user that creates a bullet comment
    dmid, // Bullet comment id
    text, // Text content of a bullet comment
    duration, // Duration of a bullet comment
    border, // Whether a bullet comment has a border
    borderColor, // Color of a bullet comment border
    style, // Interline style of bullet comments
}
```

It can be understood that the plurality of pieces of bullet comment data are associated with the video stream, and are posted when viewers watch video content of the video stream. When the video content is popular, the number of bullet comments of the plurality of pieces of bullet comment data may be huge, and computing resources may be greatly consumed when used to process the huge amount of bullet comment data, for example, a large number of memory resources and CPU resources are consumed. To solve the problem, this embodiment provides a rendering mode for dynamically creating a bullet comment element and a bullet comment recycling mechanism.

The so-called rendering mode for dynamically creating a bullet comment element means that a bullet comment element corresponding to current playing time of a video stream is obtained through rendering each time, but not all received bullet comment data is used for a rendering operation, to avoid slow program running or program crashes caused by obtaining all bullet comment elements through rendering. A specific implementation is as follows: A plurality of pieces of bullet comment data are traversed at a time, to screen a number of pieces of bullet comment data in a to-be-posted state, and rendering or partial rendering is performed on one or more pieces of bullet comment data in the number of screened pieces of bullet comment data, that is, some bullet comment elements are created dynamically each time.

The recycling mechanism means that unnecessary or expired bullet comment data is deleted, so that memory usage is reduced because the number of bullet comments of a plurality of pieces of bullet comment data is gradually decreased with a playing progress, and wastes of computing resources caused by re-traversing bullet comment data in an expired state are avoided because the number of subsequent traversals of the plurality of pieces of bullet comment data is reduced.

To implement the rendering mode for dynamically creating a bullet comment element and the bullet comment recycling mechanism, a plurality of pieces of bullet comment data need to be traversed continuously to find bullet comment data in the to-be-posted state and bullet comment data in the expired state, which is specifically as follows.

In step S304, traversing the plurality of pieces of bullet comment data, to query whether the plurality of pieces of bullet comment data include a number of pieces of bullet comment data in a to-be-posted state and/or at least one piece of bullet comment data in an expired state.

In an exemplary embodiment, posting time of each piece of bullet comment data in the to-be-posted state is earlier than or equal to current playing time of the video stream. A sum of posting time and moving time of each piece of bullet comment data in the expired state is earlier than the current playing time.

In an exemplary embodiment, the video playing page may be a WeChat mini program page. To adapt to a WeChat mini program framework, the method further includes: obtaining the current playing time of the video stream by: updating a timeline in a mode of simulating requestAnimationFrame by using a bullet comment timeline, to determine an updated timeline as the current playing time of the video stream.

Specifically, a bullet comment calculator and the bullet comment timeline are enabled, and after a bullet comment begins to be displayed, the bullet comment timeline exemplarily simulates video time every 16 milliseconds in the mode of simulating requestAnimationFrame to update the timeline, to determine that the bullet comment timeline and the current playing time are synchronous. stime (posting time) of each piece of bullet comment data and the current playing time are compared. If posting time of a piece of bullet comment data is earlier than or equal to the current playing time, it is considered that the piece of bullet comment data reaches the posting time, so that the piece of bullet comment data is added backwards to a queue of bullet comments to be posted. If a sum of stime (posting time) and duration (moving time) of a piece of bullet comment data is earlier than the current playing time, it indicates that the piece of bullet comment data has "expired". In another embodiment, an interval of one second may be added. To be specific, if "stime (posting time) plus duration (moving time) of a piece of bullet comment data plus one second" is earlier than the current playing time, it indicates that one second has elapsed since the end of the moving time of the piece of bullet comment data, so that it is considered that the piece of bullet comment data has "expired".

In step S306, if the plurality of pieces of bullet comment data include the at least one piece of bullet comment data in the expired state, deleting the at least one piece of bullet comment data in the expired state from the plurality of pieces of bullet comment data.

In step S308, if the plurality of pieces of bullet comment data include the number of pieces of bullet comment data in the to-be-posted state, adding the number of pieces of bullet comment data to a queue of bullet comments to be posted.

To reduce the number of subsequent traversals, the method may further include the following step: updating the plurality of pieces of bullet comment data, to delete the number of pieces of bullet comment data from the plurality of pieces of bullet comment data. To be specific, after each piece of bullet comment data is successfully added to the queue of bullet comments to be posted, this piece of bullet comment data is deleted from the plurality of pieces of bullet comment data.

A computer device 10 performs partial rendering on the number of pieces of bullet comment data in the queue of bullet comments to be posted, which is specifically as follows: Performing partial rendering on each piece of bullet comment data in the queue of bullet comments to be posted outside a view area, to obtain a bullet comment width of bullet comment content in each piece of bullet comment data. The bullet comment width of the bullet comment content in each piece of bullet comment data obtained through rendering may be used for calculating a corresponding bullet comment speed, where the bullet comment speed may be used for determining whether bullet comments may collide with each other.

The above-mentioned partial rendering operation also consumes computing resources of the computer device 10.

Figure 4:
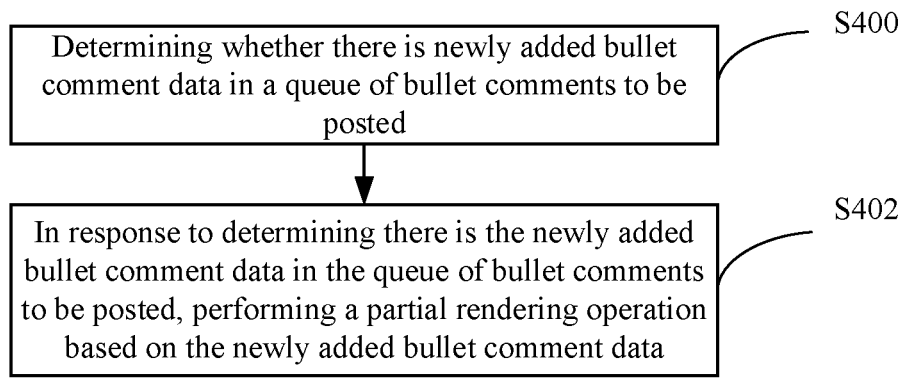
FIG. 4 schematically shows an additional step in FIG. 3.

To save the computing resources as much as possible, in an exemplary embodiment, as shown in FIG. 4, the method further includes steps S400 and S402, where: In step S400, determining whether there is newly added bullet comment data in the queue of bullet comments to be posted. In step S402, if there is the newly added bullet comment data in the queue of bullet comments to be posted, performing a partial rendering operation based on the newly added bullet comment data, to obtain a bullet comment width corresponding to the newly added bullet comment data, where the bullet comment width may be used for calculating a bullet comment speed. It can be understood that if there is no newly added bullet comment data in the queue of bullet comments to be posted, the partial rendering operation is not performed. This can reduce related operations such as obtaining a bullet comment element, thus saving computing resources.

In step S310, determining, according to a virtual bullet comment track, whether a plurality of bullet comment tracks include one or more bullet comment tracks in an idle state. If the result is yes, the process proceeds to step S312. If the result is not, the process proceeds to step S314.

Here, the virtual bullet comment track is a pre-configured nested array, the nested array includes a plurality of subarrays, and each subarray is mapped to one of the plurality of bullet comment tracks. The so-called virtual bullet comment track is proposed to achieve a good visual effect of bullet comments. Each piece of bullet comment content cannot be blocked by other bullet comment content, which requires that pieces of bullet comment content do not overlap with each other. The virtual bullet comment track essentially simulates a relationship between bullet comment content and a bullet comment track in the data format of nested array. Bullet comment data in the virtual bullet comment track is not involved in rendering at a view layer, but maps a current relationship between bullet comment content and a bullet comment track in the form of data. A working principle of the virtual bullet comment track is to add the same number of array objects backwards to an array object on the basis of the number of bullet comment tracks configured when the bullet comment system is initialized, which is similar to the form of [[ ], [ ], [ ], [ ], . . . ]. Each subarray in the nested array represents one bullet comment track.

To ensure that pieces of bullet comment content do not overlap with each other, the following determination mechanisms are provided:

[Determination mechanism 1]: S1, determining whether an $i^{th}$ subarray is empty, the $i^{th}$ subarray corresponding to an $i^{th}$ bullet comment track; S2, if the $i^{th}$ subarray is empty, determining that a current state of the $i^{th}$ bullet comment track is an idle state; S3, if the $i^{th}$ subarray is not empty, determining that a current state of the $i^{th}$ bullet comment track is a crowded state; and S4, updating a value of i, and executing steps S1 to S4 on the basis of the updated value of i until i is equal to M, where $1 \leq i \leq M$, an initial value of i is 1, and M represents the number of the plurality of bullet comment tracks.

[Determination mechanism 2]: S1, determining whether an $i^{th}$ subarray is empty, the $i^{th}$ subarray corresponding to an $i^{th}$ bullet comment track; S2, if the $i^{th}$ subarray is empty, determining that a current state of the $i^{th}$ bullet comment track is an idle state; S3, if the $i^{th}$ subarray is not empty, which indicates that moving bullet comment content already exists in the $i^{th}$ bullet comment track, determining whether queue head bullet comment content in queue head bullet comment data to be posted in the queue of bullet comments to be posted and tail bullet comment content in the posted tail bullet comment data may collide; S4, if the two may not collide, determining that a current state of the $i^{th}$ bullet comment track is an idle state; S5, if the two may collide, determining that a current state of the $i^{th}$ bullet comment track is a crowded state; and S6, updating a value of i, and executing steps S1 to S6 on the basis of the updated value of i until i is equal to M, where $1 \leq i \leq M$, an initial value of i is 1, and M represents the number of the plurality of bullet comment tracks.

It should be noted the queue head bullet comment data to be posted is bullet comment data located at the head of the queue of bullet comments to be posted. The posted tail bullet comment data is posted bullet comment data located at the tail of the $i^{th}$ subarray, the posted tail bullet comment data corresponds to the last bullet comment data in the $i^{th}$ subarray, and the tail bullet comment content corresponds to the latest posted bullet comment content presented in the $i^{th}$ bullet comment track.

The determining whether queue head bullet comment content in queue head bullet comment data to be posted in the queue of bullet comments to be posted and tail bullet comment content in the posted tail bullet comment data may collide may be implemented through the following steps: (1) calculating presentation time $t_1+t_2$ of the tail bullet comment content in the posted tail bullet comment data in the bullet comment displaying area according to posting time $t_1$ and moving time $t_2$ in the posted tail bullet comment data; (2) calculating arrival time $t_3+[w_1*t_4/(w_1+w_2)]$ when the queue head bullet comment content in the queue head bullet comment data to be posted reaches a left boundary (which is specified according to an animation style, and if the animation style is from left to right, calculating the arrival time when the queue head bullet comment content in the queue head bullet comment data to be posted reaches a right boundary) of the bullet comment displaying area according to posting time $t_3$, moving time $t_4$, and a bullet comment width $w_2$ of the queue head bullet comment data to be posted and a displaying width $w_1$ of the bullet comment displaying area; (3) determining whether the presentation time $t_1+t_2$ is earlier than the arrival time $t_3+[w_1*t_4/(w_1+w_2)]$; (4) if the presentation time $t_1+t_2$ is earlier than the arrival time $t_3[w_1*t_4/(w_1+w_2)]$, determining that the queue head bullet comment content in the queue head bullet comment data to be posted and the tail bullet comment content in the posted tail bullet comment data may not collide; and (5) if the presentation time $t_1+t_2$ is not earlier than the arrival time $t_3+[w_1*t_4/(w_1+w_2)]$, determining that the queue head bullet comment content in the queue head bullet comment data to be posted and the tail bullet comment content in the posted tail bullet comment data may collide.

It can be easily understood that, it is assumed that posting time and moving time of the last piece of bullet comment content in the $i^{th}$ bullet comment track are $t_1$ and $t_2$ respectively, and then time when the last piece of bullet comment content completely disappears from the bullet comment displaying area (the view area) is $t_1+t_2$, and it is assumed that the posting time, the moving time, and the bullet comment width of the queue head bullet comment data to be posted and the displaying width of the bullet comment displaying area are $t_3$, $t_4$, $w_2$, and $w_1$ respectively, and then a moving speed of the queue head bullet comment content in the queue head bullet comment data to be posted is $s_1=(w_1+w_2)/t_4$. Therefore, it may be concluded that time when the queue head bullet comment content in the queue head bullet comment data to be posted reaches the left boundary (which is specified according to an end motion position) of the bullet comment displaying area for the first time is $t_3+(w_1/s_1)$. When $t_1+t_2 < t_3+(w_1/s_1)$, it indicates that when the last piece of bullet comment content completely disappears from the bullet comment displaying area, the queue head bullet comment content in the queue head bullet comment data to be posted still has not caught up with the last piece of bullet comment content. This means that the last piece of bullet comment content and the queue head bullet comment content in the queue head bullet comment data to be posted will not collide, and therefore, it may be determined that a current state of the $i^{th}$ bullet comment track is the idle state.

In step S312, adding one or more pieces of bullet comment data in the queue of bullet comments to be posted to the virtual bullet comment track, where the virtual bullet comment track is used to determine whether each bullet comment track is in the idle state, and adding the one or more pieces of bullet comment data in the queue of bullet comments to be posted to a rendering list, to obtain one or more corresponding bullet comment elements through rendering.

For example:

The queue of bullet comments to be posted includes bullet comment data A1, bullet comment data A2, bullet comment data A3, . . . arranged sequentially from the queue head to the queue tail, and the queue head bullet comment data to be posted in the queue of bullet comments to be posted is currently the bullet comment data A1.

① A current state of the first bullet comment track is determined by using the first subarray in the virtual bullet comment track.

② When the current state of the first bullet comment track is the idle state, the bullet comment data A1 is separately added backwards to the rendering list and the first subarray, and the bullet comment data A1 is deleted from the bullet comment data to be posted, so as to update bullet comment data (that is, the bullet comment data A2) subsequent to the bullet comment data A1 to the queue head bullet comment data to be posted in the queue of bullet comments to be posted. Bullet comment content in the bullet comment data A1 in the rendering list is rendered, to obtain a moving animation style and the like. The bullet comment data A1 in the first subarray is used to indicate that bullet comment content in the bullet comment data A1 currently exists in the first bullet comment track.

③ Then, a current state of the second bullet comment track is determined by using the second subarray in the virtual bullet comment track.

④ When the current state of the second bullet comment track is the idle state, the bullet comment data A2 is separately added backwards to the rendering list and the second subarray, and the bullet comment data A2 is deleted from the bullet comment data to be posted, so as to update bullet comment data (that is, the bullet comment data A3) subsequent to the bullet comment data A2 to the queue head bullet comment data to be posted in the queue of bullet comments to be posted.

⑤ Then, a current state of the third bullet comment track is determined by using the third subarray in the virtual bullet comment track.

⑥ When the current state of the third bullet comment track is the crowded state, a current state of the fourth bullet comment track is directly determined by using the fourth subarray in the virtual bullet comment track.

Others may be deduced by analogy, and details are not provided herein.

In step S314, deleting at least part of bullet comment data in the queue of bullet comments to be posted.

For example:

No bullet comment track being in the idle state indicates that the current number of bullet comments is too large and exceeds a rendering capacity of a screen, and therefore, bullet comment data in the queue of bullet comments to be posted may be deleted.

① A current state of the first bullet comment track is determined by using the first subarray in the virtual bullet comment track.

② When the current state of the first bullet comment track is the crowded state, the current state of the second bullet comment track is directly determined by using the second subarray in the virtual bullet comment track.

③ When the current state of the second bullet comment track is the crowded state, the current state of the third bullet comment track is directly determined by using the third subarray in the virtual bullet comment track.

By analogy, if all the bullet comment tracks (M tracks) are in the crowded state, at least part of bullet comment data in the queue of bullet comments to be posted is deleted.

It should be noted that, for functionalities encapsulated based on an idea of model-view-controller (MVC) in the WeChat mini program framework, rendering is completed by the WeChat mini program framework.

The following piece of bullet comment data is taken as an example:

```
[
  {
    Color: '#fff',
    Text 'This is text content of a bullet comment',
    Style: 'transform: translate(-100%, 0); transition: .6s all lienar;'
  }
]
```

The piece of bullet comment data is bound, in a WeiXin markup language (WXML) file, to a bullet comment element. When a WeChat mini program is notified to update a view according to data by using a setData API, the WeChat mini program renders, based on the piece of bullet comment data, a piece of bullet comment, whose font color is white, content is "This is text content of a bullet comment", way of the movement is to move linearly from an original point to a distance which is 100% of the width of the bullet comment itself, and time of the movement is 0.6 s. This animation effect may be achieved on the basis of transition attributes of CSS3.

In addition, it can be further understood that bullet comment data in the virtual bullet comment track or the rendering list will be expired eventually, and therefore, a deletion operation needs to be performed in the virtual bullet comment track or the rendering list, to further save the computing resources of the computer device 10.

Figure 5:
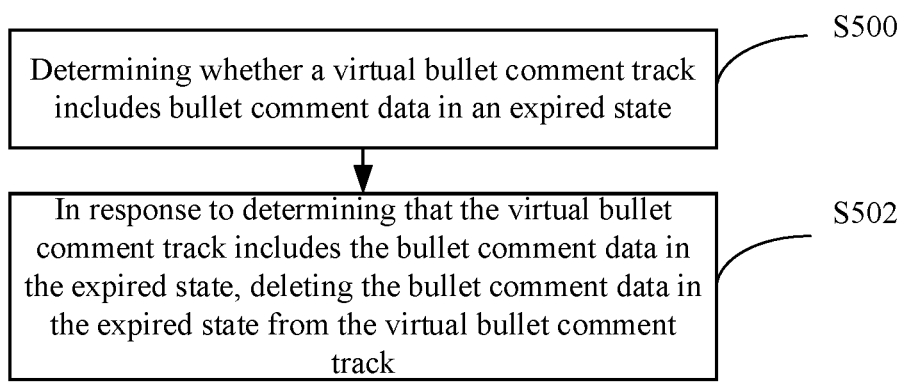
FIG. 5 schematically shows another additional step in FIG. 3.

As shown in FIG. 5, in an exemplary embodiment, the method may further include steps S500 to S502, where: In step S500, determining whether the virtual bullet comment track includes bullet comment data in an expired state. In step S502, if the virtual bullet comment track includes the bullet comment data in the expired state, deleting the bullet comment data in the expired state from the virtual bullet comment track. If the virtual bullet comment track does not include the bullet comment data in the expired state, the foregoing operation is not performed.

Figure 6:
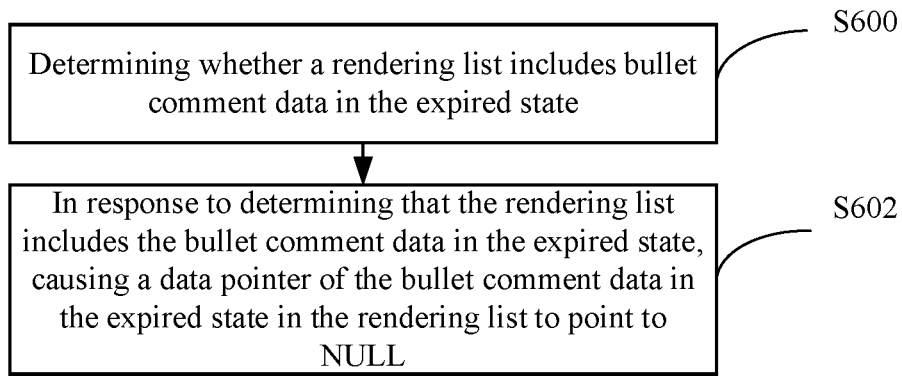
FIG. 6 schematically shows another additional step in FIG. 3.

As shown in FIG. 6, in an exemplary embodiment, the method may further include steps S600 to S602, where: In step S600, determining whether the rendering list includes bullet comment data in the expired state. In step S602, if the rendering list includes the bullet comment data in the expired state, enabling a data pointer of the bullet comment data in the expired state in the rendering list to point to NULL. If the rendering list does not include the bullet comment data in the expired state, the foregoing operation is not performed.

Due to a limitation of the WeChat mini program framework, rendering in creating and destroying a bullet comment element during developing a WeChat mini program is performed through data binding. The inventor has found that when there is the bullet comment data in the expired state in the rendering list, if the bullet comment data in the expired state is directly deleted, a rendering animation is messed up due to a changed data order. Therefore, in this embodiment, the data pointer of the bullet comment data in the expired state in the rendering list is enabled to point to NULL, so that a data position is reserved at the same time when a piece of bullet comment data is deleted, and normal rendering on a bullet comment element at the view layer is ensured, thus eventually implementing a bullet comment element recycling mechanism in a WeChat mini program page.

Figure 7:
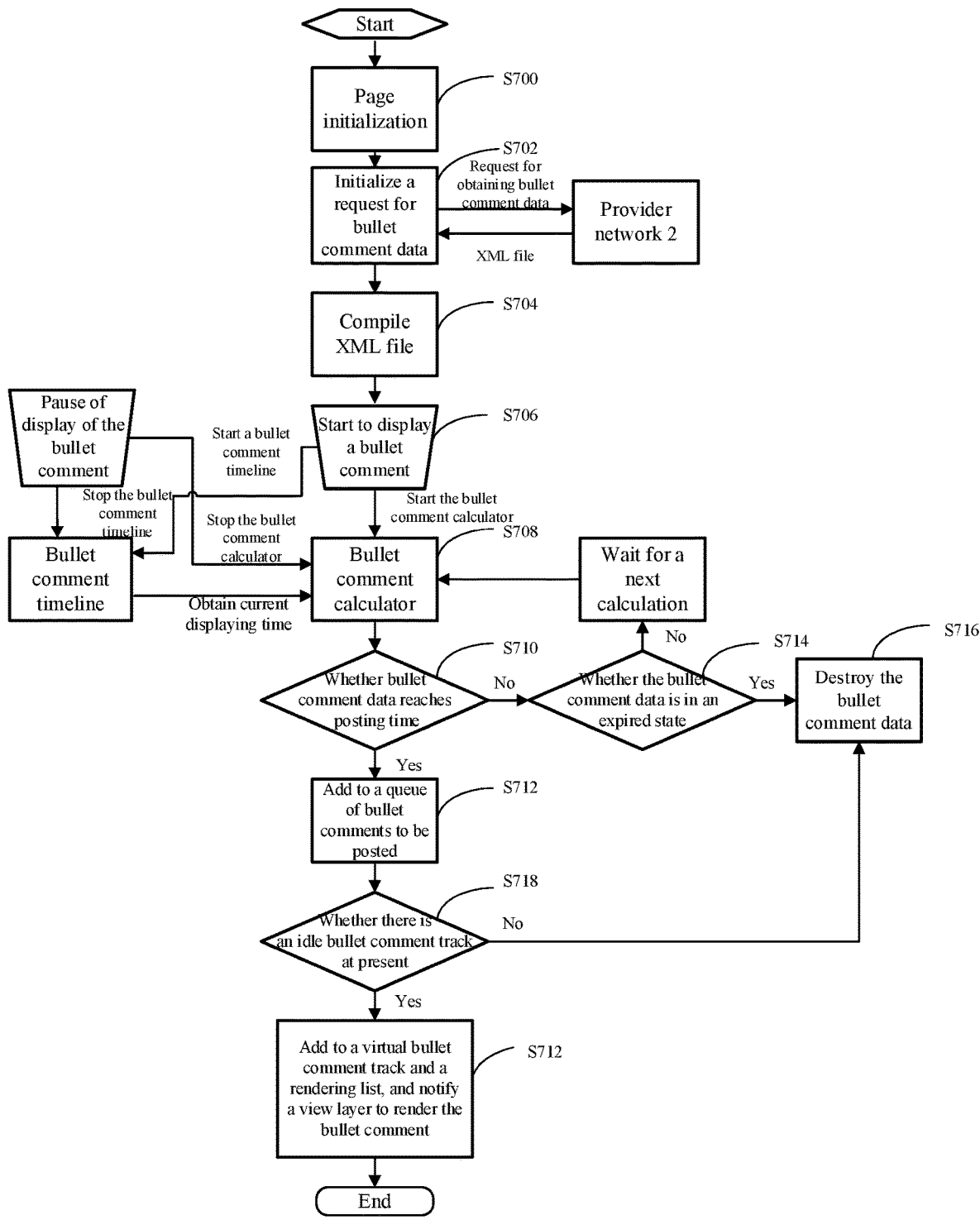
FIG. 7 is another flowchart schematically showing a method for processing a bullet comment according to Embodiment 2 of the present application.

As shown in FIG. 7, the following provides a specific example for better understanding. It should be noted that this example is not used to limit the protection scope of the patent.

In step S700, an initialization operation is performed on a WeChat mini program page (that is, a video playing page).

In step S702, a request for bullet comment data is initiated.

After the WeChat mini program page is initialized, a bullet comment loader initiates the request for the bullet comment data to a provider network 2, and receives an extensible markup language (XML) file returned by the provider network 2.

The bullet comment loader is located at a logical layer of the WeChat mini program page. The logical layer also includes a bullet comment calculator and a bullet comment timeline.

In step S704, the XML file is compiled to obtain a plurality of pieces of bullet comment data.

Specifically, the XML file is compiled into an Element object, a plurality of pieces of bullet comment data, for example, attributes (bullet comment data) such as bullet comment content, posting time, a bullet comment color, and moving time are obtained from the Element object, and these attributes are converted into a json data format and stored in a local array, to obtain a plurality of pieces of bullet comment data stored in the local array.

The plurality of pieces of bullet comment data may be used for bullet comment displaying; or may be used as original data, and not used for bullet comment displaying, for example, the plurality of pieces of bullet comment data may be cloned, and a plurality of pieces of bullet comment data obtained after cloning are used for bullet comment displaying.

In this example, the plurality of pieces of bullet comment data are used for bullet comment displaying.

In step S706, a bullet comment starts to be displayed.

The bullet comment calculator is used for bullet comment screening and calculation. The bullet comment timeline is used to manage the bullet comment timeline, that is, synchronizing with current playing time of a video stream.

The bullet comment calculator and the bullet comment timeline are located at a logical layer of the application program 12 (such as a browser and a WeChat mini program), and the bullet comment timeline and the bullet comment calculator may work concurrently in a recursively called frame rendering mode through the logical layer.

When the bullet comment calculator detects that processing of the plurality of pieces of bullet comment data is completed, the bullet comment calculator and the bullet comment timeline stop running and a bullet comment system is reset. In addition, if the computer device 10 detects that a user clicks a pause button or video playing is completed, the bullet comment calculator and the bullet comment timeline may pause or stop running at the same time.

In step S708, each piece of bullet comment data is traversed by the bullet comment calculator to perform calculation and screening, to determine whether each piece of bullet comment data is in a to-be-posted state or in an expired state.

The following takes one piece of bullet comment data j therein as an example:

In step S710, whether the bullet comment data j reaches posting time is determined. If the result is yes, the process proceeds to step S712, otherwise, the process proceeds to step S714.

According to current playing time of a video stream and the posting time in the bullet comment data j, whether bullet comment content in the bullet comment data j reaches the posting time is determined, that is, whether the bullet comment data j is in the to-be-posted state at present is determined.

In step S712, the bullet comment data j is added to a queue of bullet comments to be posted. The process proceeds to step S718.

The view layer is notified to perform a data update operation, and perform the first rendering operation according to the bullet comment data in the to-be-posted state.

For example, real bullet comment elements are inserted outside a view area, which is invisible to a user, and no motion effects are added. Such an operation aims at obtaining a real bullet comment width of the bullet comment element to calculate a start motion position and an end motion position of a bullet comment, and to be used as one of bases for determining whether there is a bullet comment track in an idle state in a plurality of bullet comment tracks.

The bullet comment data j added to the queue of bullet comments to be posted may be deleted from the plurality of pieces of bullet comment data to reduce the number of subsequent traversals.

In step S714, whether the bullet comment data j is in an expired state is determined. If the result is yes, the process proceeds to step S716, otherwise, the bullet comment data j waits for a next traversal operation.

In step S716, the bullet comment data j is destroyed. For example, the bullet comment data j is deleted from the plurality of pieces of bullet comment data to reduce the number of subsequent traversals.

In step S718, whether there is an idle bullet comment track at present is determined. If the result is yes, the process proceeds to step S720, otherwise, the process proceeds to step S716.

Exemplarily, a bullet comment width of a bullet comment element obtained after the first rendering operation is obtained. Whether the plurality of bullet comment tracks include a bullet comment track in the idle state is determined according to the bullet comment width of the bullet comment element.

It is assumed that posting time and moving time of the last piece of bullet comment content in the $k^{th}$ bullet comment track are $t_1$ and $t_2$ respectively, and then time when the last piece of bullet comment content completely disappears from the bullet comment displaying area (the view area) is $t_1+t_2$, and it is assumed that the posting time, the moving time, and the bullet comment width of the bullet comment data j and the displaying width of the bullet comment displaying area are $t_3$, $t_4$, $w_2$, and $w_1$ respectively, and then a moving speed of the bullet comment data j is $s_1=(w_1+w_2)/t_4$. Therefore, it may be concluded that time when the bullet comment content of the bullet comment data j reaches the left boundary of the bullet comment displaying area for the first time is $t_3+(w_1/s_1)$. When $t_1+t_2<t_3+(w_1/s_1)$, it indicates that when the last piece of bullet comment content completely disappears from the bullet comment displaying area, the bullet comment content of the bullet comment data j still has not caught up with the last piece of bullet comment content. This means that the last piece of bullet comment content and the bullet comment content of the bullet comment data j will not collide, and therefore, it may be determined that a current state of the $k^{th}$ bullet comment track is the idle state.

In step S720, adding is performed to a virtual bullet comment track and a rendering list, and the view layer is notified to perform a data update operation to perform the second rendering operation.
① The bullet comment data j in the queue of bullet comments to be posted is added to the virtual bullet comment track. The virtual bullet comment track is used for determining whether each bullet comment track is in the idle state.
② The bullet comment data j in the queue of bullet comments to be posted is added to the rendering list to create a corresponding bullet comment element such as a motion effect.

Embodiment 3

Figure 8:
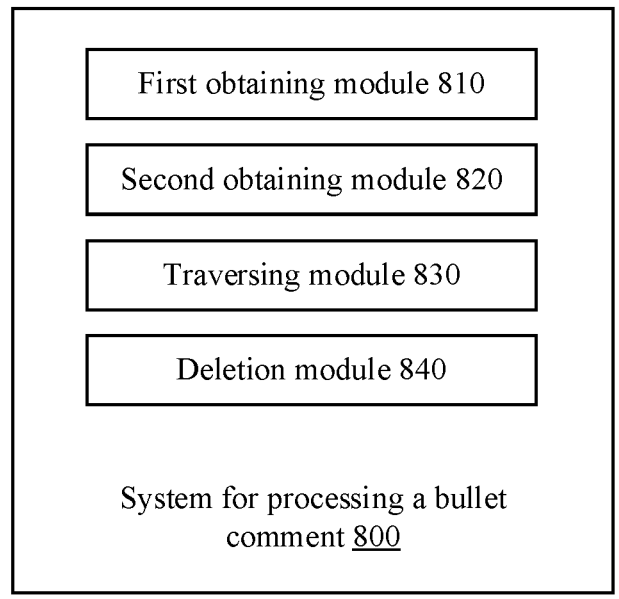
FIG. 8 is a block diagram schematically showing a communication system according to Embodiment 3 of the present application.

FIG. 8 schematically shows a block diagram of a system for processing a bullet comment according to Embodiment 3 of the present application. The system for processing a bullet comment may be divided into one or more program modules, and the one or more program modules are stored in a storage medium and executed by one or more processors to implement the embodiments of the present application. The program modules referred to in the embodiments of the present application refer to a series of computer-readable instruction segments that can complete a specific function. The functions of various program modules in the embodiments will be specifically described in the following descriptions.

As shown in FIG. 8, the system 800 for processing a bullet comment may include a first obtaining module 810, a second obtaining module 820, a traversing module 830, and a deletion module 840.

The first obtaining module 810 is configured to obtain a video playing page, to output a video stream.

The second obtaining module 820 is configured to obtain a plurality of pieces of bullet comment data associated with the video stream.

The traversing module 830 is configured to traverse the plurality of pieces of bullet comment data, to query whether the plurality of pieces of bullet comment data include at least one piece of bullet comment data in an expired state.

The deletion module 840 is configured to: if the plurality of pieces of bullet comment data include the at least one piece of bullet comment data in the expired state, delete the at least one piece of bullet comment data in the expired state from the plurality of pieces of bullet comment data.

In an exemplary embodiment, the traversing module 830 is further configured to: traverse the plurality of pieces of bullet comment data, to query whether the plurality of pieces of bullet comment data include a number of pieces of bullet comment data in a to-be-posted state, where posting time of each piece of bullet comment data in the to-be-posted state is earlier than or equal to current playing time of the video stream; and a sum of posting time and moving time of each piece of bullet comment data in the expired state is earlier than the current playing time.

In an exemplary embodiment, the video playing page is a WeChat mini program page. A third obtaining module is further included and is configured to: obtain the current playing time of the video stream by: updating a timeline in a mode of simulating requestAnimationFrame by using a bullet comment timeline, to determine an updated timeline as the current playing time of the video stream.

In an exemplary embodiment, a bullet comment displaying module is further included and is configured to: if the plurality of pieces of bullet comment data include the number of pieces of bullet comment data in the to-be-posted state, add the number of pieces of bullet comment data to a queue of bullet comments to be posted; determine, according to a virtual bullet comment track, whether a plurality of bullet comment tracks include one or more bullet comment tracks in an idle state, where the virtual bullet comment track is a pre-configured nested array, the nested array includes a plurality of subarrays, and each subarray is mapped to one of the plurality of bullet comment tracks; and if the plurality of bullet comment tracks include the one or more bullet comment tracks in the idle state: add one or more pieces of bullet comment data in the queue of bullet comments to be posted to the virtual bullet comment track, where the virtual bullet comment track is used to determine whether each bullet comment track is in the idle state, and add the one or more pieces of bullet comment data in the queue of bullet comments to be posted to a rendering list, to obtain one or more corresponding bullet comment elements through rendering.

In an exemplary embodiment, the bullet comment displaying module is further configured to: determine whether there is newly added bullet comment data in the queue of bullet comments to be posted; and if there is the newly added bullet comment data in the queue of bullet comments to be posted, perform a partial rendering operation based on the newly added bullet comment data, to obtain a bullet comment width of the newly added bullet comment data, where the bullet comment width is used for calculating a bullet comment speed.

In an exemplary embodiment, the deletion module 840 is further configured to: determine whether the virtual bullet comment track includes bullet comment data in the expired state; and if the virtual bullet comment track includes the bullet comment data in the expired state, delete the bullet comment data in the expired state from the virtual bullet comment track.

In an exemplary embodiment, the video playing page is a WeChat mini program page. The deletion module 840 is further configured to: determine whether the rendering list includes bullet comment data in the expired state; and if the rendering list includes the bullet comment data in the expired state, enable a data pointer of the bullet comment data in the expired state in the rendering list to point to NULL.

Embodiment 4

Figure 9:
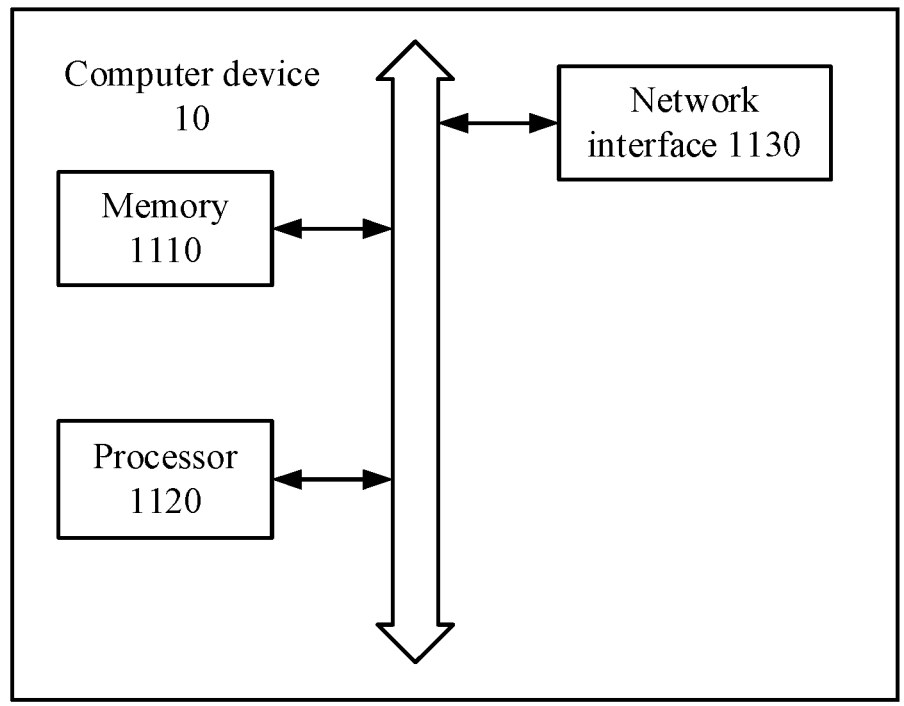
FIG. 9 is a schematic diagram schematically showing a hardware architecture of a computer device suitable for implementing a method for processing a bullet comment according to Embodiment 4 of the present application.

FIG. 9 schematically shows a schematic diagram of a hardware architecture of a computer device suitable for implementing a method for processing a bullet comment according to Embodiment 4 of the present application. In this embodiment, a computer device 10 is a device that may automatically perform numerical calculation and/or information processing according to preset or pre-stored instructions. The computer device 10 may be, for example, a smartphone, a computer, a projector, a set-top box, etc., or may be a virtual machine host process and one or more virtual machine instances, or a rack server, a blade server, a tower server, or a cabinet server (including an independent server or a server cluster composed of a plurality of servers), etc. As shown in FIG. 9, the computer device 10 at least includes, but is not limited to, a memory 1010, a processor 1020, and a network interface 1030, which may be communicatively connected to each other through a system bus, where:

The memory 1010 includes at least one type of computer-readable storage medium, and the readable storage medium includes a flash memory, a hard disk, a multimedia card, a card-type memory (e.g., an SD or DX memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 1010 may be an internal storage module of the computer device 10, for example, a hard disk or a memory of the computer device 10. In some other embodiments, the memory 1010 may alternatively be an external storage device of the computer device 10, for example, a plug-in hard disk disposed on the computer device 10, a smart media card (SMC for short), a secure digital (SD for short) card, and a flash card, etc. Certainly, the memory 1010 may alternatively include both the internal storage module of the computer device 10 and the external storage device thereof. In this embodiment, the memory 1010 is generally configured to store an operating system and various application software installed in the computer device 10, such as program codes for a method for processing a bullet comment. In addition, the memory 1010 may be configured to temporarily store various types of data that has been output or will be output.

The processor 1020 may be, in some embodiments, a central processing unit (CPU for short), a controller, a microcontroller, a microprocessor, or other data processing chips. The processor 1020 is generally configured to control overall operation of the computer device 10, for example, executing control, processing, etc. related to data exchange or communication with the computer device 10. In this embodiment, the processor 1020 is configured to run program codes stored in the memory 1010 or process data.

The network interface 1030 may include a wireless network interface or a wired network interface, and the network interface 1030 is generally configured to establish a communication connection between the computer device 10 and other computer devices. For example, the network interface 1030 is configured to connect the computer device 10 to an external terminal through a network, and establish a data transmission channel, a communication link, etc. between the computer device 10 and the external terminal. The network may be a wireless or wired network such as Intranet, Internet, Global System of Mobile communication (GSM for short), wideband code division multiple access (WCDMA for short), a 4G network, a 5G network, Bluetooth, or Wi-Fi.

It should be noted that FIG. 9 shows only a computer device with components 1010 to 1030, but it should be understood that not all of the illustrated components are required to be implemented, and more or fewer components may be implemented instead.

In this embodiment, the method for processing a bullet comment stored in the memory 1010 may alternatively be divided into one or more program modules and executed by one or more processors (by the processor 1020 in this embodiment) to implement the present application.

Embodiment 5

This embodiment further provides a computer-readable storage medium having stored thereon computer-readable instructions, where when the computer-readable instructions are executed by a processor, the following steps are implemented: obtaining a video playing page, to output a video stream; obtaining a plurality of pieces of bullet comment data associated with the video stream; traversing the plurality of pieces of bullet comment data, to query whether the plurality of pieces of bullet comment data include at least one piece of bullet comment data in an expired state; and if the plurality of pieces of bullet comment data include the at least one piece of bullet comment data in the expired state, deleting the at least one piece of bullet comment data in the expired state from the plurality of pieces of bullet comment data.

In this embodiment, the computer-readable storage medium includes a flash memory, a hard disk, a multimedia card, a card-type memory (e.g., an SD or DX memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device. In some other embodiments, the computer-readable storage medium may alternatively be an external storage device of the computer device, for example, a plug-in hard disk disposed on the computer device, a smart media card (SMC for short), a secure digital (SD for short) card, and a flash card, etc. Certainly, the computer-readable storage medium may alternatively include both the internal storage unit of the computer device and the external storage device thereof. In this embodiment, the computer-readable storage medium is generally configured to store an operating system and various application software installed in the computer device, such as program codes for a method for processing a bullet comment in the embodiments. In addition, the computer-readable storage medium may be configured to temporarily store various types of data that has been output or will be output.

It will be apparent to those skilled in the art that the various modules or steps in the embodiments of the present application can be implemented by a general-purpose computing device that can be centralized on a single computing device or distributed across a network formed by a plurality of computing devices. Optionally, they may be implemented by program codes executable by the computing device, such that they may be stored in a storage device and executed by the computing device, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely illustrative of preferred embodiments of the present application, and are not intended to limit the patent scope of the present application. Any equivalent structure or equivalent process transformation made using the contents of the description and accompanying drawings of the present application, or any direct or indirect application thereof in other related technical fields shall equally fall within the patent protection scope of the present application.

What is claimed is:

1. A method for processing bullet comments, comprising:
obtaining a page of playing a video to output a video stream;
obtaining a plurality of pieces of bullet comment data associated with the video stream;
traversing the plurality of pieces of bullet comment data and determining whether the plurality of pieces of bullet comment data comprise at least one piece of bullet comment data in an expired state based on a current playing time of the video, a posting time and a moving time associated with each of the plurality of pieces of bullet comment data, wherein a posting time indicates a time point of posting a bullet comment element corresponding to each piece of bullet comment data in the video, wherein a moving time indicates a time duration of the corresponding bullet comment element moving and being displayed on the page of playing the video, and wherein a sum of a posting time and a moving time associated with the at least one piece of bullet comment data in the expired state is earlier than the current playing time of the video;
deleting the at least one piece of bullet comment data in the expired state from the plurality of pieces of bullet comment data in response to determining that the plurality of pieces of bullet comment data comprise the at least one piece of bullet comment data in the expired state;
traversing the plurality of pieces of bullet comment data and determining that the plurality of pieces of bullet comment data comprise a number of pieces of bullet comment data in a to-be-posted state based on the current playing time of the video and the posting time associated with each of the plurality of pieces of bullet comment data;
adding the number of pieces of bullet comment data to a queue of bullet comments to be posted;
determining, based on a virtual bullet comment track, that a plurality of bullet comment tracks comprise one or more bullet comment tracks in an idle state, wherein the virtual bullet comment track is a pre-configured nested array, the nested array comprises a plurality of subarrays, and each subarray is mapped to one of the plurality of bullet comment tracks;
adding one or more pieces of bullet comment data in the queue of bullet comments to be posted to the virtual bullet comment track, the virtual bullet comment track being configured to determine whether each bullet comment track is in the idle state; and
adding the one or more pieces of bullet comment data in the queue of bullet comments to be posted to a rendering list, and obtaining one or more corresponding bullet comment elements through rendering.

2. The method of claim 1, wherein the page of playing the video is a WeChat mini program page, the method further comprising:
obtaining the current playing time of the video comprising: updating a timeline in a mode of simulating requestAnimationFrame by using a bullet comment timeline to obtain an updated timeline, and determining the current playing time of the video based on the updated timeline.

3. The method of claim 1, further comprising:
determining whether there is a piece of newly added bullet comment data in the queue of bullet comments to be posted; and
in response to determining that there is the piece of newly added bullet comment data in the queue of bullet comments to be posted, performing a partial rendering operation based on the piece of newly added bullet comment data and obtaining a width of a bullet comment element corresponding to the piece of newly added bullet comment data.

4. The method of claim 1, further comprising:
determining whether the virtual bullet comment track comprises a piece of bullet comment data in the expired state; and
in response to determining that the virtual bullet comment track comprises the piece of bullet comment data in the expired state, deleting the piece of bullet comment data in the expired state from the virtual bullet comment track.

5. The method of claim 1, wherein the page of playing the video is a WeChat mini program page, the method further comprising:
determining whether the rendering list comprises a piece of bullet comment data in the expired state; and
in response to determining that the rendering list comprises the piece of bullet comment data in the expired state, causing a data pointer of the piece of bullet comment data in the expired state in the rendering list to point to NULL.

6. A computer device, comprising a memory, a processor, and computer-readable instructions stored on the memory and executable on the processor, wherein when executing the computer-readable instructions, the processor implements operations comprising:
obtaining a page of playing a video to output a video stream;
obtaining a plurality of pieces of bullet comment data associated with the video stream;
traversing the plurality of pieces of bullet comment data and determining whether the plurality of pieces of bullet comment data comprise at least one piece of bullet comment data in an expired state based on a current playing time of the video, a posting time and a moving time associated with each of the plurality of pieces of bullet comment data, wherein a posting time indicates a time point of posting a bullet comment element corresponding to each piece of bullet comment data in the video, wherein a moving time indicates a time duration of the corresponding bullet comment element moving and being displayed on the page of playing the video, and wherein a sum of a posting time and a moving time associated with the at least one piece of bullet comment data in the expired state is earlier than the current playing time of the video;
deleting the at least one piece of bullet comment data in the expired state from the plurality of pieces of bullet comment data in response to determining that the plurality of pieces of bullet comment data comprise the at least one piece of bullet comment data in the expired state;

traversing the plurality of pieces of bullet comment data and determining that the plurality of pieces of bullet comment data comprise a number of pieces of bullet comment data in a to-be-posted state based on the current playing time of the video and the posting time associated with each of the plurality of pieces of bullet comment data;

adding the number of pieces of bullet comment data to a queue of bullet comments to be posted;

determining, based on a virtual bullet comment track, that a plurality of bullet comment tracks comprise one or more bullet comment tracks in an idle state, wherein the virtual bullet comment track is a pre-configured nested array, the nested array comprises a plurality of subarrays, and each subarray is mapped to one of the plurality of bullet comment tracks;

adding one or more pieces of bullet comment data in the queue of bullet comments to be posted to the virtual bullet comment track, the virtual bullet comment track being configured to determine whether each bullet comment track is in the idle state; and adding the one or more pieces of bullet comment data in the queue of bullet comments to be posted to a rendering list, and obtaining one or more corresponding bullet comment elements through rendering.

7. The computer device of claim 6, wherein the page of playing the video is a WeChat mini program page, the operations further comprising:

obtaining the current playing time of the video stream comprising: updating a timeline in a mode of simulating requestAnimationFrame by using a bullet comment timeline to obtain an updated timeline, and determining the current playing time of the video based on the updated timeline.

8. The computer device of claim 6, the operations further comprising:

determining whether there is a piece of newly added bullet comment data in the queue of bullet comments to be posted; and in response to determining that there is the piece of newly added bullet comment data in the queue of bullet comments to be posted, performing a partial rendering operation based on the piece of newly added bullet comment data and obtaining a width of a bullet comment element corresponding to the piece of newly added bullet comment data.

9. The computer device of claim 6, the operations further comprising:

determining whether the virtual bullet comment track comprises a piece of bullet comment data in the expired state; and in response to determining that the virtual bullet comment track comprises the piece of bullet comment data in the expired state, deleting the piece of bullet comment data in the expired state from the virtual bullet comment track.

10. The computer device of claim 6, wherein the page of playing the video is a WeChat mini program page, the operations further comprising:

determining whether the rendering list comprises a piece of bullet comment data in the expired state; and in response to determining that the rendering list comprises the piece of bullet comment data in the expired state, causing a data pointer of the piece of bullet comment data in the expired state in the rendering list to point to NULL.

11. A non-transitory computer-readable storage medium having stored thereon computer-readable instructions, the computer-readable instructions being executable by at least one processor to cause the at least one processor to perform operations comprising:

obtaining a page of playing a video to output a video stream;

obtaining a plurality of pieces of bullet comment data associated with the video stream;

traversing the plurality of pieces of bullet comment data and determining whether the plurality of pieces of bullet comment data comprise at least one piece of bullet comment data in an expired state based on a current playing time of the video, a posting time and a moving time associated with each of the plurality of pieces of bullet comment data, wherein a posting time indicates a time point of posting a bullet comment element corresponding to each piece of bullet comment data in the video, wherein a moving time indicates a time duration of the corresponding bullet comment element moving and being displayed on the page of playing the video, and wherein a sum of a posting time and a moving time associated with the at least one piece of bullet comment data in the expired state is earlier than the current playing time of the video;

deleting the at least one piece of bullet comment data in the expired state from the plurality of pieces of bullet comment data in response to determining that the plurality of pieces of bullet comment data comprise the at least one piece of bullet comment data in the expired state;

traversing the plurality of pieces of bullet comment data and determining that the plurality of pieces of bullet comment data comprise a number of pieces of bullet comment data in a to-be-posted state based on the current playing time of the video and the posting time associated with each of the plurality of pieces of bullet comment data;

adding the number of pieces of bullet comment data to a queue of bullet comments to be posted;

determining, based on a virtual bullet comment track, that a plurality of bullet comment tracks comprise one or more bullet comment tracks in an idle state, wherein the virtual bullet comment track is a pre-configured nested array, the nested array comprises a plurality of subarrays, and each subarray is mapped to one of the plurality of bullet comment tracks;

adding one or more pieces of bullet comment data in the queue of bullet comments to be posted to the virtual bullet comment track, the virtual bullet comment track being configured to determine whether each bullet comment track is in the idle state; and adding the one or more pieces of bullet comment data in the queue of bullet comments to be posted to a rendering list, and obtaining one or more corresponding bullet comment elements through rendering.

12. The non-transitory computer-readable storage medium of claim 11, wherein the page of playing the video is a WeChat mini program page, the operations further comprising:

obtaining the current playing time of the video comprising: updating a timeline in a mode of simulating requestAnimationFrame by using a bullet comment timeline to obtain an updated timeline, and determining the current playing time of the video based on the updated timeline.

13. The non-transitory computer-readable storage medium of claim 12, the operations further comprising:
- determining whether there is a piece of newly added bullet comment data in the queue of bullet comments to be posted; and
- in response to determining that there is the piece of newly added bullet comment data in the queue of bullet comments to be posted, performing a partial rendering operation based on the piece of newly added bullet comment data and obtaining a width of a bullet comment element corresponding to the piece of newly added bullet comment data.

14. The non-transitory computer-readable storage medium of claim 11, the operations further comprising:
- determining whether the virtual bullet comment track comprises a piece of bullet comment data in the expired state; and
- in response to determining that the virtual bullet comment track comprises the piece of bullet comment data in the expired state, deleting the piece of bullet comment data in the expired state from the virtual bullet comment track.

15. The non-transitory computer-readable storage medium of claim 11, wherein the page of playing the video is a WeChat mini program page, the operations further comprising:
- determining whether the rendering list comprises a piece of bullet comment data in the expired state; and
- in response to determining that the rendering list comprises the piece of bullet comment data in the expired state, causing a data pointer of the piece of bullet comment data in the expired state in the rendering list to point to NULL.

* * * * *